United States Patent
Ott et al.

(10) Patent No.: US 6,609,757 B2
(45) Date of Patent: Aug. 26, 2003

(54) VEHICLE SEAT

(75) Inventors: Richard Ott, Kümmersbruck (DE); Nikolaus Haller, Ammerthal (DE); Hermann Meiller, Wernberg-Köblitz (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 09/939,948

(22) Filed: Aug. 27, 2001

(65) Prior Publication Data

US 2002/0105216 A1 Aug. 8, 2002

(30) Foreign Application Priority Data

Aug. 30, 2000 (DE) .......................... 100 42 530

(51) Int. Cl.[7] .................................. A47C 7/54
(52) U.S. Cl. ................. 297/411.2; 297/112; 297/188.04
(58) Field of Search .................. 297/112, 146, 297/163, 188.04, 411.2, 411.25, 238

(56) References Cited

U.S. PATENT DOCUMENTS

| | | | | |
|---|---|---|---|---|
| 530,880 A | * | 12/1894 | Briggs, Jr. .................. 297/298 |
| 1,337,886 A | * | 4/1920 | Debakey ..................... 297/163 |
| 2,031,883 A | | 2/1936 | Gedris | |
| 2,173,569 A | * | 9/1939 | Troendle .................... 297/146 |
| 2,436,294 A | * | 2/1948 | Glatstein .................... 297/115 |
| 2,731,078 A | * | 1/1956 | Cadman et al. .......... 297/411.2 |
| 2,935,120 A | * | 5/1960 | Naus .......................... 297/337 |
| 3,068,048 A | * | 12/1962 | Mahon et al. .......... 297/188.15 |
| 3,350,133 A | * | 10/1967 | Schaefer ..................... 297/232 |
| 3,544,163 A | * | 12/1970 | Krein ..................... 297/411.32 |
| 3,612,606 A | * | 10/1971 | Swenson ............... 297/411.31 |
| 4,200,166 A | * | 4/1980 | Hansen ........................ 180/315 |
| 4,322,111 A | * | 3/1982 | Barley et al. ................ 297/357 |
| 4,533,175 A | * | 8/1985 | Brennan ..................... 297/232 |
| 4,770,107 A | * | 9/1988 | Miller ......................... 108/44 |
| 4,792,183 A | * | 12/1988 | Townsend, III ............. 297/163 |
| 5,290,092 A | * | 3/1994 | Geer ..................... 297/411.32 |
| 5,788,324 A | * | 8/1998 | Shea et al. .................. 297/113 |
| 6,135,548 A | * | 10/2000 | McGuire .................... 297/163 |

FOREIGN PATENT DOCUMENTS

| | | |
|---|---|---|
| DE | 3046049 A1 | 7/1982 |
| DE | 4126518 A1 * | 2/1993 |
| DE | 94 09 353.9 | 3/1995 |
| DE | 298 04 359.9 | 7/1998 |
| FR | 1415648 | 8/1964 |
| FR | 2148736 | 3/1973 |

* cited by examiner

Primary Examiner—Peter M. Cuomo
Assistant Examiner—Joseph Edell
(74) Attorney, Agent, or Firm—Elliot M. Olstein; Raymond J. Lillie

(57) ABSTRACT

A vehicle seat includes a backrest with a forearm support carried thereon at the rear side thereof, the aim being to improve the level of comfort for the user of the seat in a position of facing rearwardly.

7 Claims, 5 Drawing Sheets

VEHICLE SEAT

FIELD OF THE INVENTION

The invention relates to a vehicle seat and more particularly a vehicle seat having a backrest capable of affording enhanced operator comfort.

BACKGROUND OF THE INVENTION

Drivers of vehicles frequently find it necessary to turn to face towards the rear, to carry out suitable manoeuvres involving the rear of the vehicle in which the operator is sitting. This is the case for example more particularly with the drivers of tractors or fork-lift trucks who turn towards the rear to carry out operating manoeuvres with their vehicle. A similar consideration can also apply in regard to truck drivers.

In that respect attention may be directed to DE 298 04 359 U1 disclosing a vehicle seat in which the two side edges are each formed with a respective recess configuration. That affords a free space for the elbows of the arms of the occupant of the seat so that it is possible for that person to face rearwardly of the vehicle.

Attention may be also be directed to DE 30 46 049 A1 disclosing a seat having a backrest wherein the backrest or at least the upper portion of the backrest is pivotable about a vertical axis. That arrangement is intended to ensure that the seat can be adapted to the position of the seat occupant, which the respective operating demands of any given situation involve.

Mention may also be made of FR 1 415 648 and U.S. Pat. No. 2,031,883 disclosing chairs having backrests which each have a respective recess configuration at each of their two side edges.

SUMMARY OF THE INVENTION

An object of the invention is to provide a vehicle seat permitting a further improvement in operator comfort when facing rearwardly.

Another object of the invention is to provide a vehicle seat so designed as to permit the seat occupant to be in a more stable and secure position on the seat when facing rearwardly thereon.

Yet another object of the present invention is to provide a vehicle seat affording better anatomically and ergonomically adapted support for the seat occupant when facing rearwardly to operate the vehicle.

In accordance with the principles of the present invention the foregoing and other objects are attained by a vehicle seat comprising a backrest, wherein provided at the rear side of the backrest is a forearm support on which the seat occupant can rest the forearm when facing rearwardly of the seat.

As will be seen from the description hereinafter of a preferred embodiment of the vehicle seat in accordance with the invention, that seat affords the advantage that, when the seat occupant is in a seating position of having turned to face rearwardly, the seat occupant can rest the forearm of the arm which is not required for steering the vehicle on the forearm support at the rear of the backrest. That therefore provides for optimum support and contributes to substantially reducing fatigue of the free arm which is not required for steering purposes. The vehicle seat according to the invention can therefore afford optimum user comfort in that posture.

It will be appreciated that the structure of the invention can be used to optimum effect in relation to vehicle seats with a relatively short backrest as that affords greater ease of movement for the occupant.

Particularly in the case of vehicle seats which have a relatively wide or high backrest, in accordance with a preferred feature of the invention at least one side edge of the backrest has a recess which serves to receive the upper arm or the shoulder region adjacent thereto of the seat occupant when that person faces rearwardly away from the usual direction of the vehicle. In that situation, the forearm support at the rear side of the backrest is associated with the recess in the side edge of the backrest.

In the case of a vehicle seat of the configuration just referred to, in accordance with the invention, the backrest may have a recess only at one of its two side edges, with the forearm support being associated with that recess. In the case of a vehicle referred to as a left-hand drive vehicle the recess, as viewed in the direction of forward travel of the vehicle, is usually disposed at the right-hand side edge of the backrest of the vehicle seat. Conversely in the case of a right-hand drive vehicle the recess will usually be disposed at the left-hand side edge of the backrest. It will be appreciated however that the invention is not limited to those two alternatives.

In a preferred feature of the vehicle seat according to the invention the forearm support can extend from the respective side edge of the backrest to a central region of the rear side of the backrest. In that configuration, it has proven desirable for the forearm support to extend inclinedly upwardly from the respective side edge to the central region of the rear side of the backrest. That can provide for optimum adaptation to the anatomical factors of the respective occupant of the seat.

In accordance with a further preferred feature of the invention the forearm support is formed with a convexly curved forearm support surface, from the respective side edge of the backrest to the central region of the rear side thereof.

In a further preferred feature of the invention the backrest may have a backrest carrier which is stable in respect of shape and which affords a substantial surface area and on which the forearm support is disposed, the backrest carrier being provided at the front side with a backrest cushion portion. With such a configuration of the vehicle seat the forearm support may have a support body which is stable in respect of shape and which is covered with support upholstery. The support body of the forearm support in that case can be an independent member which is suitably secured to the backrest carrier of the backrest. It is likewise possible for the support body of the forearm support to be an integral component of the backrest carrier of the backrest. That eliminates assembly expenditure as is required when securing an independent and thus separate support body of the forearm support to the backrest carrier.

So that the vehicle seat according to the invention can be readily used in relation to right-hand drive and also left-hand drive vehicles, the backrest carrier may be of such a configuration as to afford two side edge contours which involve mirror-image symmetry, with or without one or more recesses. That can simplify manufacture of the backrest carriers for vehicle seats according to the invention and the stockkeeping thereof. If the vehicle seat according to the invention has a recess as indicated above, then that recess at one side of the backrest can be formed by a backrest cushion portion having side edge contours which do not involve mirror-image symmetry.

In a further preferred feature of the invention it is also possible for the backrest to be provided at both of its side edges with a respective recess, with the forearm support extending at the rear side of the backrest between the two side edges thereof. Such a vehicle seat can be put to optimum use in relation to right-hand drive and left-hand drive vehicles without involving further modifications to the seat structure.

Further objects, features and advantages of the invention will be apparent from the description hereinafter of a preferred embodiment of a vehicle seat according to the invention.

DESCRIPTION OF THE PREFERRED EMBODIMENT

Figure 1:
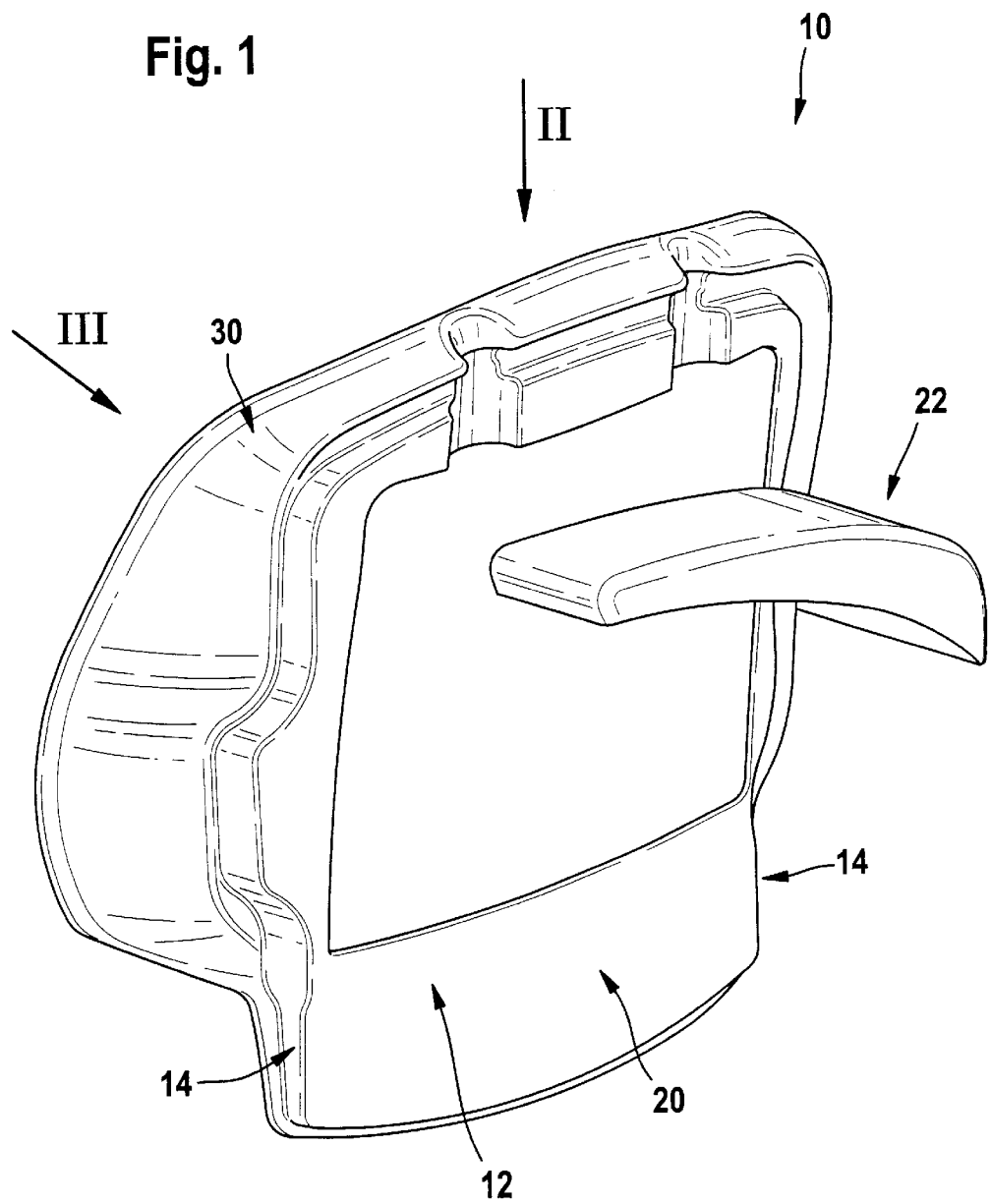
FIG. 1 is a perspective view of a backrest of a vehicle seat according to the invention, viewing inclinedly downwardly and from the rear towards the backrest of the seat.

Before entering on a description of the illustrated embodiment of the invention it will be noted that the same features of the vehicle seat according to the invention are identified in each of FIGS. 1 through 5 by the same reference numerals.

Referring firstly to FIG. 1, shown therein is a perspective view of a backrest indicated generally at 10 of a vehicle seat. The backrest 10 has a backrest carrier or support structure 12 which is stable in respect of shape to act as a frame to afford structural rigidity to the backrest, the backrest carrier involving for example a stamped sheet metal component. As can be particularly clearly seen from FIG. 4 the backrest carrier 12 has two side edge contours 14 which are of mirror-image relationship with a central vertical line of symmetry indicated at 16 in FIG. 4. Each of the two side edges 14 of the backrest carrier 12 is provided in the upper part thereof with a respective recess as indicated at 18 in FIG. 4. This part of the configuration of the backrest of the seat can also be clearly seen from FIG. 5.

Figure 3:
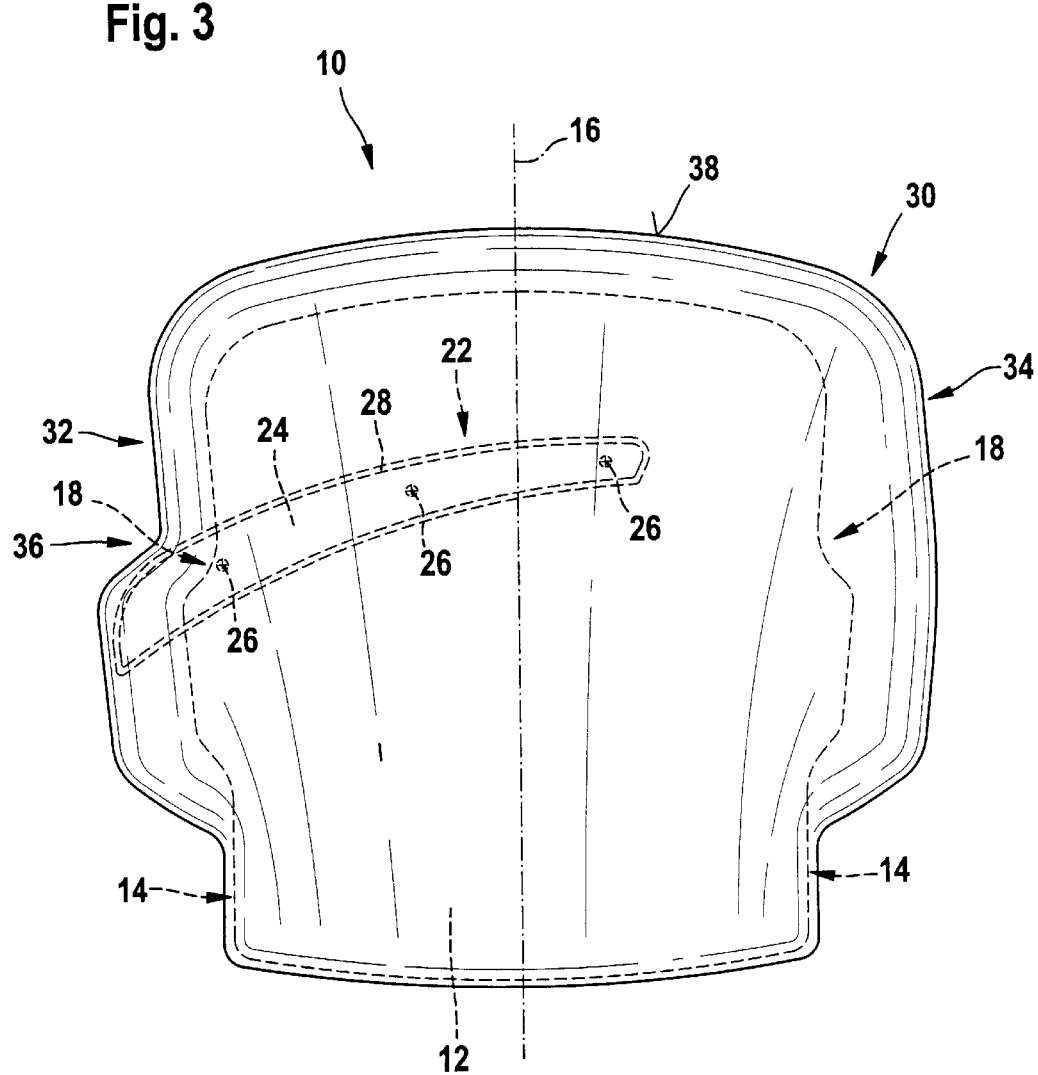
FIG. 3 is a view of the backrest viewing in the direction of the arrow III in FIG. 1, as a front view.
Figure 4:
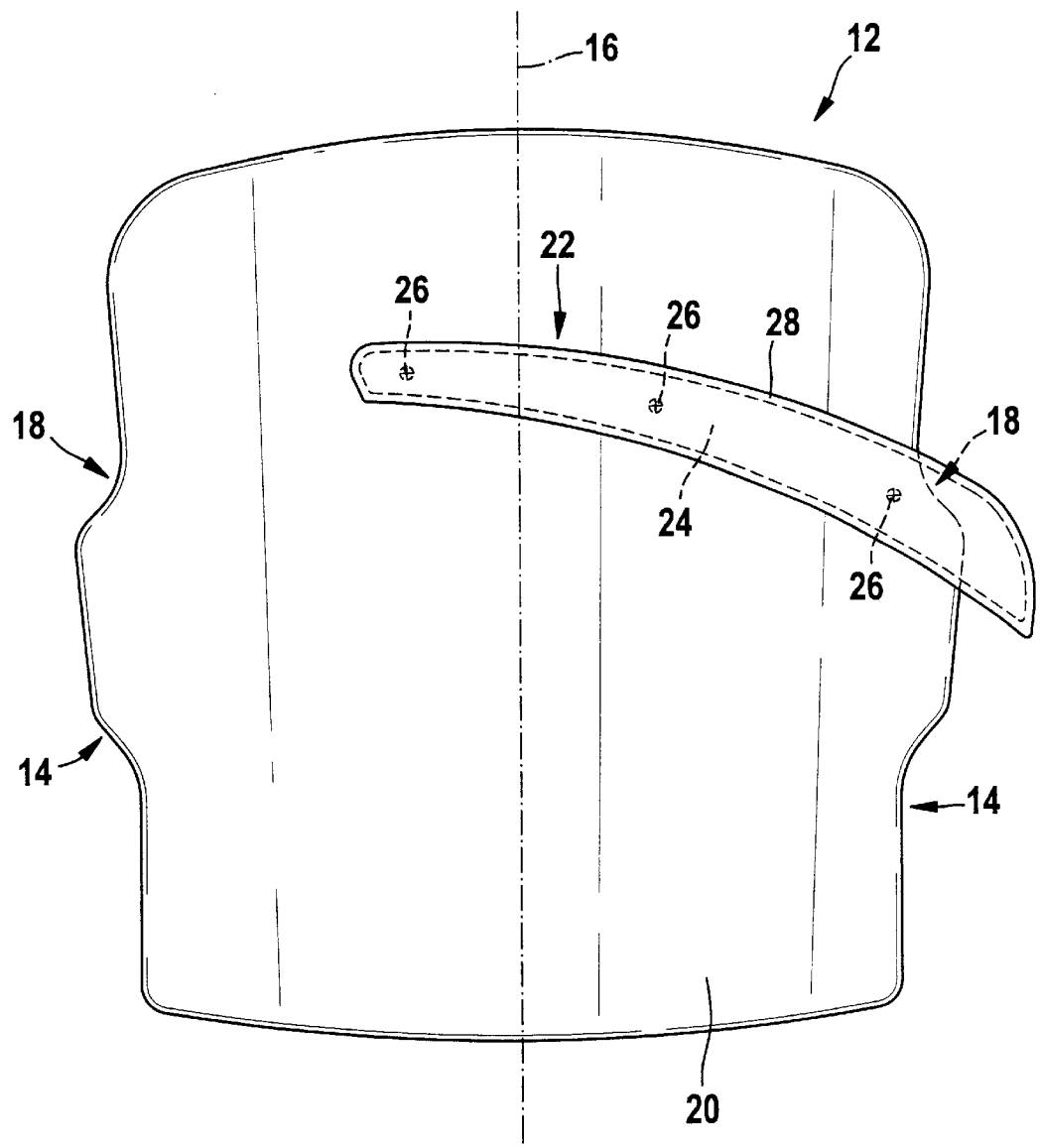
FIG. 4 is a view of the backrest carrier which is stable in respect of shape of the backrest shown in FIGS. 1 through 3 in combination with the forearm support viewing from the rear of the seat.
Figure 5:
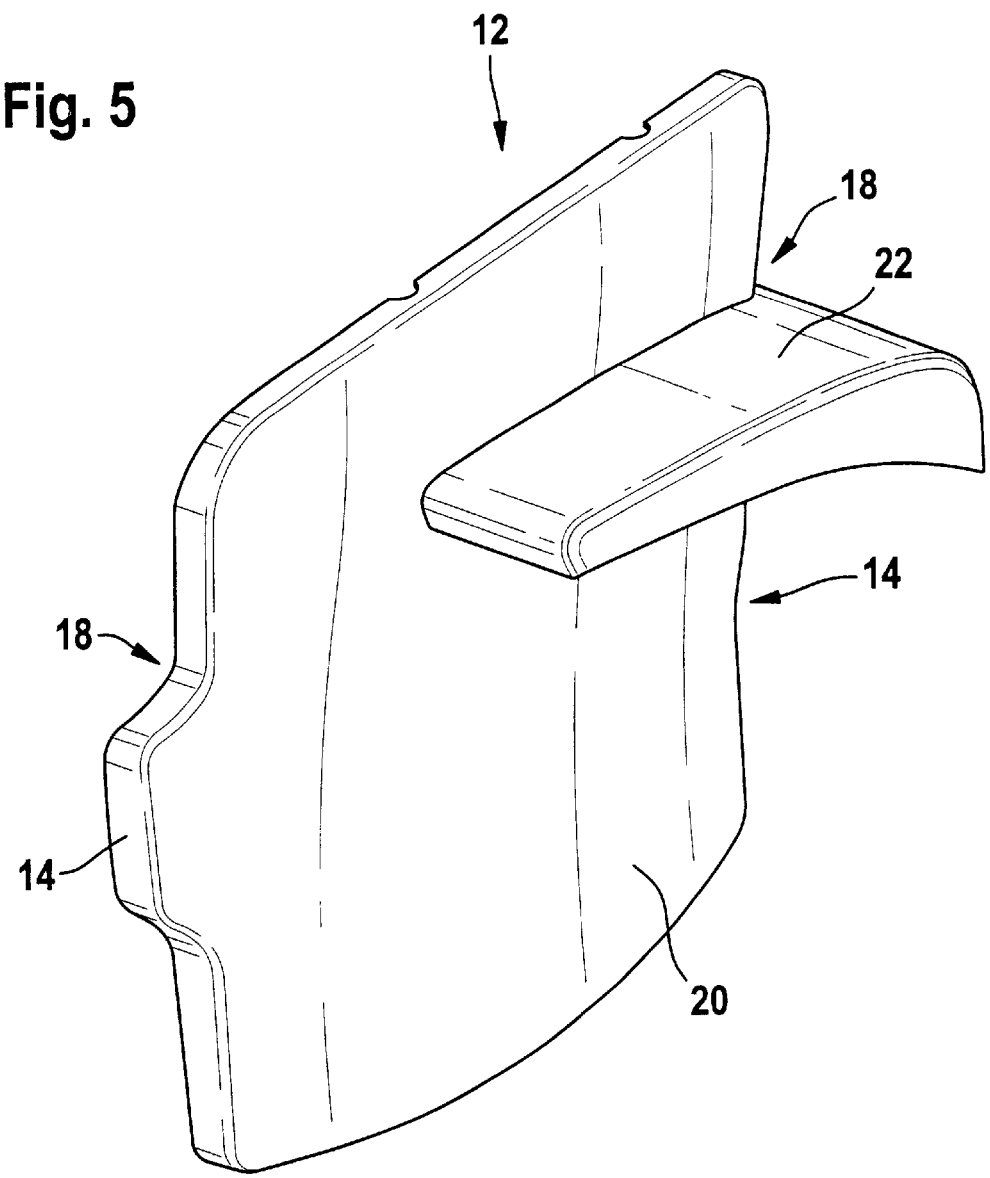
FIG. 5 is a perspective view of the backrest carrier with the forearm support as shown in FIG. 4 viewing from above and from the rear of the seat.

Referring still to FIG. 4, disposed at the rear side 20 of the backrest carrier 12 is a forearm support 22. Looking now also at FIGS. 3 and 4 the forearm support 22 comprises a support body 24 which is secured to the backrest carrier 12 by means of screws indicated at 26. The support body 24 is covered with upholstery 28. The forearm support 22 of that configuration is mounted to the backrest carrier 12 of the backrest 10 at the rear side 20 thereof in such a way that it extends from the respective side edge 14 inclinedly upwardly to a central region of the rear side 20 of the backrest carrier 12, with the upwardly facing surface of the forearm support 22 being of an upwardly convexly curved configuration.

Figure 2:
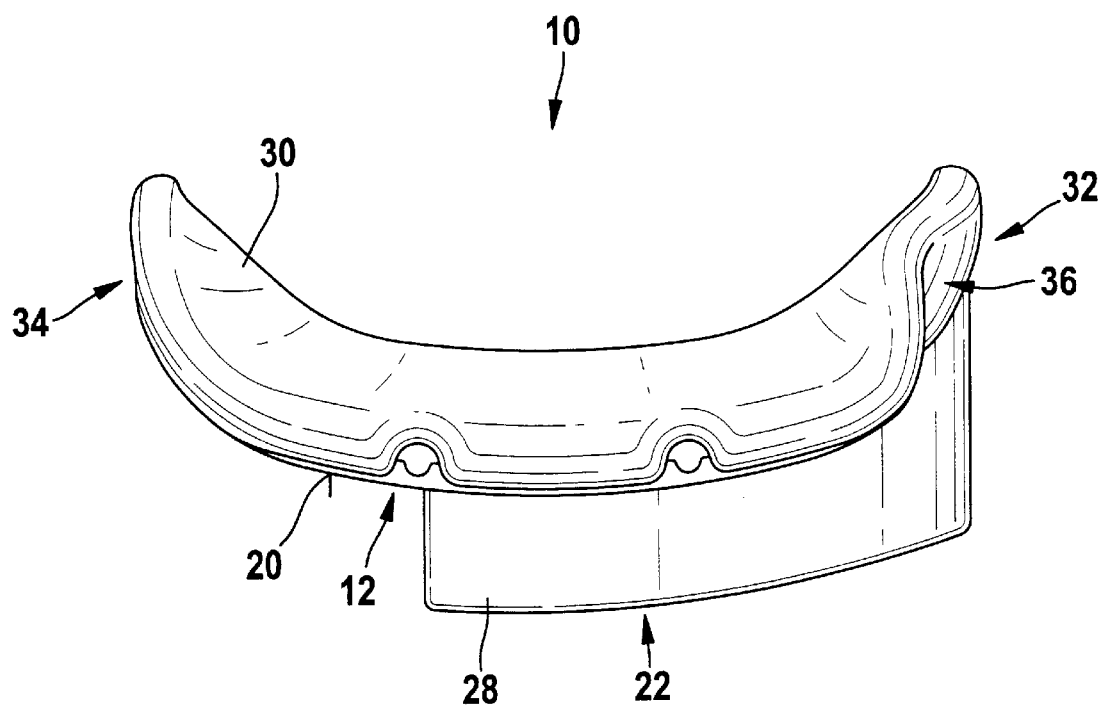
FIG. 2 is a view of the FIG. 1 backrest viewing in the direction of the arrow II in FIG. 1, from above the backrest.

The backrest carrier 12 is combined at its front side with a backrest cushion portion as indicated at 30 in FIGS. 1 through 3. The backrest cushion portion 30 is of such a configuration as to have two side edge contours indicated at 32 and 34 in FIG. 3, which are not of a mirror-image configuration in relation to the central vertical line of symmetry 16, as can be clearly seen from FIG. 3. In other words, only the side edge contour 32 is of such a configuration as to afford a recess 36 in the upholstery of the backrest. The side edge recess 36 in the backrest cushion portion 30 is adapted in respect of shape to the corresponding recess 18 of the backrest carrier 12 of the backrest 10, while the other side edge contour 34 of the backrest cushion portion 30 extends without a recess therein and consequently covers over the associated recess 18 in the backrest carrier 12. It will be noted that the backrest carrier 12 which is stable in respect of shape to afford the required supporting effect for the backrest to retain the shape thereof is of a substantial surface area for suitably supporting the cushion portion 30.

It can be clearly seen from this view that, as noted above, the forearm support 22 extends from the side edge 32 with the recess 36, to the central region of the rear side 20 of the backrest, in a slightly upwardly inclined configuration, of an upwardly convexly curved shape.

The backrest 10 is of such a dimension in respect of height that the top edge 38 of the backrest is under the shoulder or armpit of the corresponding arm when the occupant of the seat faces rearwardly from the usual forwardly oriented direction of travel of the vehicle in which the seat is fitted. The corresponding forearm is then supported on the forearm support 22 so that this can avoid fatigue on the part of the operator, even after working for a prolonged period of time in a rearwardly facing posture. That has a positive effect not only in terms of operator comfort but also operating reliability and safety.

It will be appreciated that the vehicle seat according to the invention is not restricted to the illustrated embodiment with a lateral recess 36 at the side of the backrest 10, in other words, the backrest 10 may also be without such a lateral recess 36. The aspect of primary significance here is the forearm support 22 disposed at the rear side 20 of the backrest 10.

It will be further appreciated that, the invention not being limited to the illustrated embodiment, it is also possible for the vehicle seat to be the subject of modifications and alterations without thereby departing from the spirit and scope of the invention.

What is claimed is:

1. A vehicle seat, including:
   a backrest having a front side and a rear side, a flat backrest carrier portion disposed on said rear side of said backrest, and a backrest cushion portion disposed on the front side of the backrest carrier portion, wherein the backrest has first and second side edges and at least one of said first and second side edges includes a recess adapted for receiving an upper arm portion of a seat occupant when the seat occupant faces rearwardly of the seat;
   a forearm support disposed upon said backrest carrier portion on said rear side of said backrest, said forearm support including a support body, wherein said forearm support is associated operatively with said recess in said side edge; and
   means for fixing said support body of said forearm support to said carrier portion of said rear side of said bracket along a side of said forearm support.

2. The vehicle seat of claim 1, wherein said backrest has a recess at only one of said first and second side edges, said forearm support being associated operatively with said recess.

3. The vehicle seat of claim 1 wherein said rear side of said backrest further includes a central region and said forearm support extends from a side edge to said central region at said rear side of said backrest.

4. The vehicle seat of claim 3 wherein said forearm support extends inclinedly and upwardly from the respective side edge to said central region at said rear side of said backrest.

5. The vehicle seat of claim 3 wherein said forearm support includes a convexly curved forearm support surface extending from said respective side edge to said central region at said rear side of said backrest.

6. The vehicle seat of claim 1 wherein said backrest carrier portion is formed with two side edge contours with mirror-image symmetry.

7. The vehicle seat of claim 1 wherein said recess at one side of said backrest is formed by a backrest cushion portion having side edge contours which are not of mirror-image symmetry.

* * * * *